United States Patent [19]
Gill

[11] Patent Number: 5,867,351
[45] Date of Patent: Feb. 2, 1999

[54] SPIN VALVE READ HEAD WITH LOW MOMENT, HIGH COERCIVITY PINNING LAYER

[75] Inventor: Hardayal Singh Gill, Portola Valley, Calif.

[73] Assignee: International Business Machines Corporation, Armonk, N.Y.

[21] Appl. No.: 900,892

[22] Filed: Jul. 25, 1997

[51] Int. Cl.[6] .................................................. G11R 5/39
[52] U.S. Cl. .............................................................. 360/113
[58] Field of Search ............................. 360/113; 324/252; 338/32 R

[56] References Cited

U.S. PATENT DOCUMENTS

| | | | |
|---|---|---|---|
| 5,206,590 | 4/1993 | Dieny et al. | 324/252 |
| 5,422,571 | 6/1995 | Gurney et al. | 324/252 |
| 5,452,163 | 9/1995 | Coffey et al. | 360/113 |
| 5,465,185 | 11/1995 | Heim et al. | 360/113 |
| 5,583,725 | 12/1996 | Coffey et al. | 360/113 |
| 5,661,621 | 8/1997 | Kobayashi et al. | 360/113 |
| 5,695,864 | 12/1997 | Slonczewski | 428/212 |
| 5,708,358 | 1/1998 | Ravipati | 324/252 |
| 5,715,121 | 2/1998 | Sakakima et al. | 360/113 |
| 5,738,938 | 4/1998 | Kawano et al. | 428/332 |
| 5,748,416 | 5/1998 | Tobise et al. | 360/113 |

OTHER PUBLICATIONS

H. S. Gill et al., "Orthogonal Spin Valve Sensor Stabilized by CoSm Hard Bias Film", *IBM Technical Disclosure Bulletin*, vol. 39, No. 10, Oct. 1996, pp. 97–98.

Primary Examiner—Jefferson Evans
Attorney, Agent, or Firm—Gray Cary Ware Freidenrich

[57] ABSTRACT

A spin valve sensor is provided with a spacer layer sandwiched between a free layer and a pinned layer. The pinned layer is pinned by a pinning layer constructed of a material having a high coercivity, and a low magnetic moment. The high coercivity is employed for pinning the pinned layer, and the low moment assures that stray fields from the pinning layer do not affect the coercivity of the free layer. The magnetic moment is preferably less than 300 emu/cc and the coercivity is preferably greater than 500 Oe. The magnetic orientation of the pinning layer is set by a magnetic field at room temperature that may be applied at the suspension level. The materials with which the pinning layer may be formed are amorphous materials TbFeCo and CoSm, and a non-amorphous material CoPtCr, provided the Cr is of sufficient proportion to minimize the moment of the CoPtCr material.

9 Claims, 10 Drawing Sheets

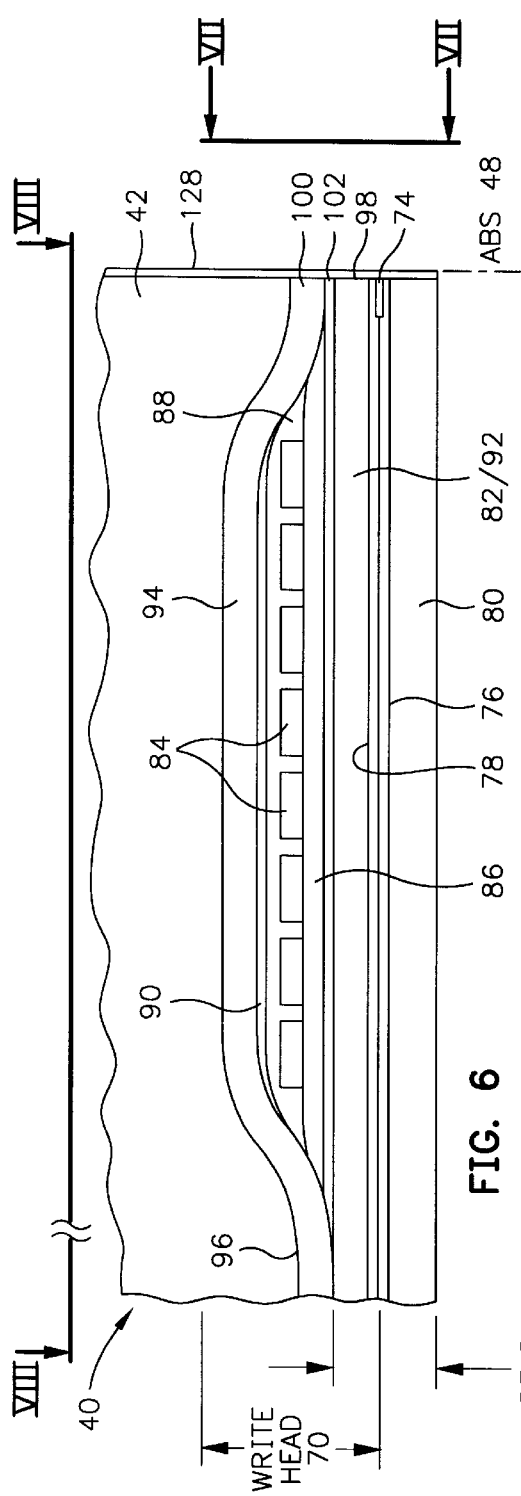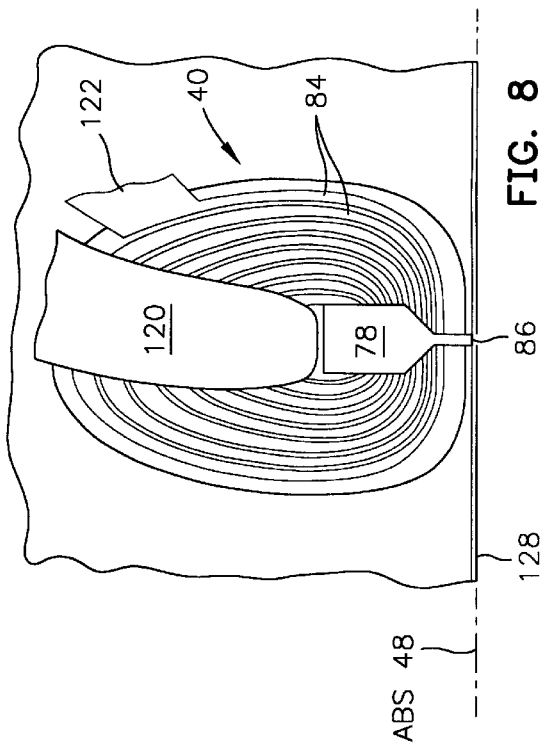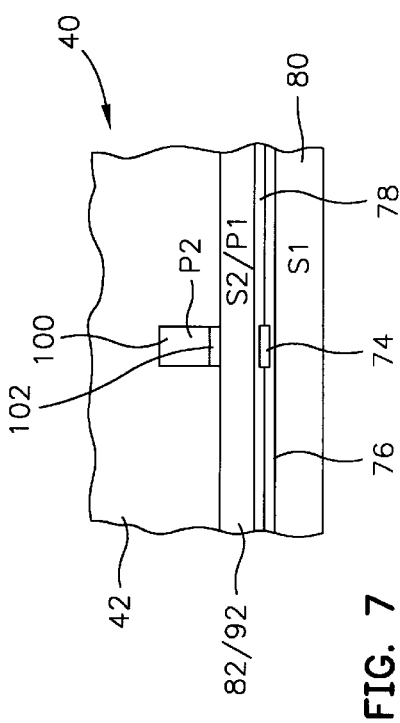

SPIN VALVE READ HEAD WITH LOW MOMENT, HIGH COERCIVITY PINNING LAYER

BACKGROUND OF THE INVENTION

1. Field of the Invention

The present invention relates to a spin valve read head that has a high magnetic moment, high coercivity pinning layer, and more particularly to a pinning layer that pins a pinned layer with its high coercivity and does not significantly impact the coercivity of a free layer because of its low magnetic moment.

2. Description of the Related Art

A read head employing a spin valve sensor (hereinafter referred to as a "spin valve read head") may be combined with an inductive write head to form a combined magnetic head. In a magnetic disk drive an air bearing surface (ABS) of the combined magnetic head is supported adjacent a rotating disk to write information on or read information from a surface of the disk. In a write mode, information is written to the surface by magnetic fields that fringe across a gap between first and second pole pieces of the write head. In a read mode, the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor includes a nonmagnetic conductive layer, also called a spacer layer, sandwiched between first and second ferromagnetic layers, referred to as a pinned layer, and a free layer. First and second leads are connected to the spin valve sensor for conducting the sense current therethrough. The magnetization of the pinned layer is maintained ("pinned") at 90° to the magnetization of the free layer. The magnetization of the free layer changes freely in response to magnetic fields from the rotating disk. The magnetization of the pinned layer is, typically, pinned by exchange coupling with an antiferromagnetic layer.

Preferably, the thickness of the spacer layer is less than the mean free path of conduction electrons through the spin valve sensor. With this arrangement, some of the conduction electrons are scattered by the interfaces of the spacer layer with the pinned and free layers. When the directions of magnetization of the pinned and free layers are parallel, scattering is minimal, and when the directions are antiparallel, scattering is maximized. Changes in the scattering change the resistance of the spin valve sensor in proportion to sin $\theta$, where $\theta$ is the angle between the magnetizations of the pinned and free layers. A spin valve sensor has a magnetoresistive (MR) coefficient that is preferably substantially higher than the MR coefficient of an anisotropic magnetoresistive (AMR) sensor. For this reason it is sometimes referred to as a giant magnetoresistive (GMR) sensor.

A spin valve transfer curve that plots the readback signal of the spin valve head versus the applied signal from the magnetic disk is defined by a substantially linear portion of sin $\theta$. With positive and negative magnetic fields from a moving magnetic disk, which are equal in magnitude, it is important that positive and negative changes in the GMR of the spin valve read head be equal in order that the positive and negative readback signals be equal. When, in a quiescent state, the direction of the magnetic moment of the free layer is parallel to the ABS and the direction of the magnetic moment of the pinned layer is perpendicular to the ABS, the positive and negative readback signals will be equal when sensing positive and negative fields from the magnetic disk. When the direction of the magnetic moment of the free layer is parallel to the ABS, the bias point on the transfer curve will be zero, and the readback signals will be symmetrical about this bias point.

The antiferromagnetic layer interfacially engages the pinned layer in order to pin the magnetization of the pinned layer in a predetermined direction by magnetic exchange coupling. During construction of the magnetic head, the antiferromagnetic pinning layer is subjected to a temperature above a blocking temperature in presence of a magnetic field. The blocking temperature is the temperature at which the antiferromagnetic effect of the material ceases and the magnetic spins are free to align in the direction of the aforementioned magnetic field. When the temperature is reduced to ambient and the magnetic field is removed, the magnetic spins of the antiferromagnetic pinning layer are oriented in a predetermined direction that is, typically, perpendicular to the ABS. The antiferromagnetic pinning layer has a face that directly engages a face of the pinned layer. The orientation of the spins at the face of the antiferromagnetic layer orient the spins of the face of pinned layer in a like direction by exchange coupling. Consequently, all of the spins of the pinned layer are oriented in the predetermined direction. A high level of exchange coupling promotes high thermal stability of the head.

Since the antiferromagnetic pinning layer is not magnetized, it exerts no magnetic influence on the free layer. This is advantageous since the magnetization of the free layer should be free to rotate about a bias point in response to magnetic fields from the rotating disk. Advantageously, the magnetization of the pinned layer can be strongly pinned by the antiferromagnetic pinning layer so that its orientation cannot be easily changed by stray magnetic fields.

Unfortunately, a serious disadvantage of the antiferromagnetic pinning layer is that it loses its orientation when its blocking temperature is exceeded. As a consequence, the magnetic moment of the pinned layer is no longer pinned in the desired direction. This can be caused during construction of the head by electrostatic discharge (ESD) from an object carrying a static charge. More often, however, the blocking temperature is exceeded during use when the head frictionally engages an asperity on the magnetic disk. Accordingly, there is a strong-felt need to improve the thermal stability of a spin valve read head by improving the performance of the pinning layer.

SUMMARY OF THE INVENTION

I have investigated several hard magnetic materials in order to identify substitutes for the antiferromagnetic material typically used as a pinning layer in a spin valve read head. In each case, the magnetization of the hard magnetic material was oriented perpendicularly to the ABS. In each case, the magnetization of the pinned layer was pinned perpendicularly to the ABS by magnetic exchange coupling with the hard magnetic material. These hard magnetic materials do not lose magnetic orientation because of high heat. Unfortunately, however, hard magnetic material has a magnetic coercivity ($H_C$) that influences the coercivity of the free layer. Free layer coercivity is the magnitude of a magnetic field of one polarity that is required to return the magnetization of the free layer to zero after an applied field of opposite polarity is removed. Coercivity is also referred to as the switching field. In this regard, after a positive applied field is removed, a negative applied field reduces the magnetization of the free layer to zero. In this case, the second field is referred to as a negative switching field. As the negative field still further increases in a negative direction, it saturates the free layer in the negative direction. An applied positive field then increases the magnetization of the free layer to zero. In this case, the second field is referred to as a positive switching field. As the positive field still further increases in a positive direction it saturates the free layer in the positive direction. The magnitudes of the positive and negative switching fields required to reduce the magnetization of the free layer to zero are a measure of the coercivity of the free layer. It can readily be appreciated that the coercivity of the free layer should be as low as possible in order that the switching field be as low as possible. The lower the switching field, the more readily the free layer responds to positive and negative fields from the rotating disk.

The hard magnetic materials that I investigated had a high magnetic moment (greater than 300 emu/cc). My further investigation showed that, when the magnetic moment was less than 300 emu/cc, high coercivity, hard magnetic material did not substantially increase the coercivity of the free layer. It is believed that, because of magnetostatic coupling between the hard magnetic materials investigated and the free layer, their high magnetic moment caused the high coercivity of these hard magnetic materials to increase the coercivity of the free layer. Accordingly, I concluded that high moment, hard magnetic materials are not a good substitute for the antiferromagnetic material.

Upon further investigation I discovered several materials for pinning the pinned layer that do not impact the magnetization of the free layer, and that have high thermal stability. These materials have high coercivity and a low, or no, magnetic moment. Therefore, instead of employing a magnetic moment, I employ the high coercivity of these unique materials to pin the magnetic moment of the pinned layer. Since these materials have low, or zero, moment, there is no, or substantially no, increase in the coercivity of the free layer. The materials that I have discovered are CoSm, TbFeCo, which are amorphous, and CoPtCr, which is not amorphous. The amorphous materials are particularly desirable because they exhibit no granular fields that would magnetostatically couple to the free layer. While the CoPtCr is not amorphous, I employ sufficient Cr in the mixture to reduce the magnetic moment to zero, or to near zero. This can be accomplished with about 15% Cr by atomic weight. It is interesting to note that the magnetization of the high coercivity material can be set to be perpendicular to the ABS by simply subjecting the material to a magnetic field directed perpendicularly to the ABS. It can now be appreciated that, should the high coercivity pinning layer lose its orientation, it can simply be reset by exposure to a magnetic field that is directed parallel to the ABS. In contrast, an antiferromagnetic pinning layer can only be reset by raising its temperature above the blocking temperature and subjecting it to a magnetic field along the ABS.

An object of the present invention is to provide a pinning layer for a spin valve sensor that has improved thermal stability and that does not affect the coercivity of the free layer.

Another object is to provide a hard magnetic pinning layer for a spin valve sensor that has high coercivity for pinning a pinned layer, but substantially no magnetic moment to affect the coercivity of the free layer.

A further object is to provide a pinning layer that can have its magnetic moment reset by a magnet at room temperature.

A further object is to employ a high coercivity pinning layer for pinning a pinned layer of a spin valve sensor without affecting the sensitivity of the sensor.

Other objects and attendant advantages of the invention will be appreciated upon reading the following description taken together with the drawings.

BRIEF DESCRIPTION OF THE DRAWINGS

FIG. 6 is a partial view of the slider and magnetic head as seen in plane VI—VI of FIG. 2;

FIG. 7 is a partial ABS view of the slider taken along plane VII—VII with the overcoat layer removed to show the read and write elements of the magnetic head;

FIG. 8 is a view taken along plane VIII—VIII of FIG. 6 with all material above the second pole piece removed and with a portion of the head back of the back gap shown to illustrate the complete coil;

DESCRIPTION OF THE PREFERRED EMBODIMENT

Figure 1:
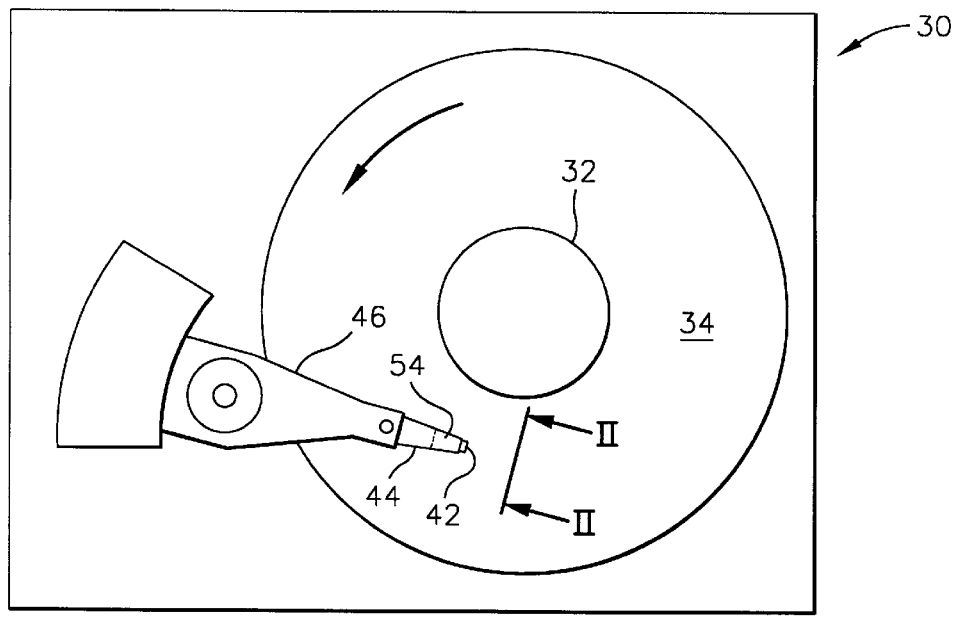
FIG. 1 is a planar view of an exemplary magnetic disk drive.
Figure 2:
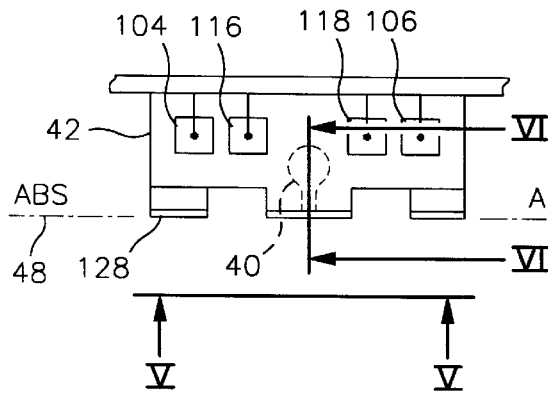
FIG. 2 is an end view of a slider with a magnetic head of the disk drive as seen in plane II—II.
Figure 3:
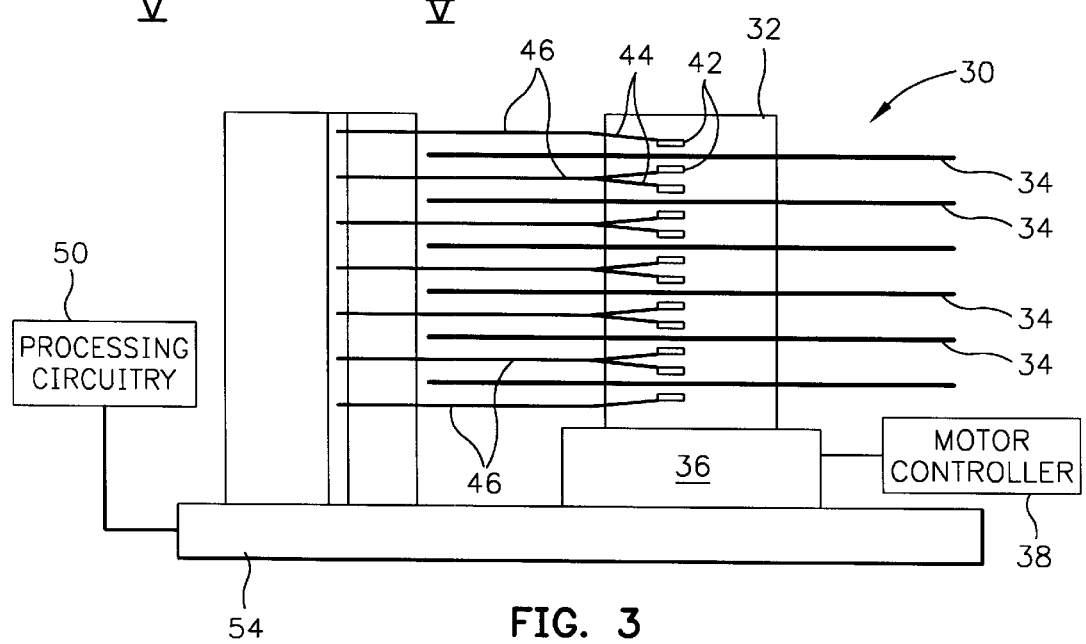
FIG. 3 is an elevation view of the magnetic disk drive wherein multiple disks and magnetic heads are employed.
Figure 4:
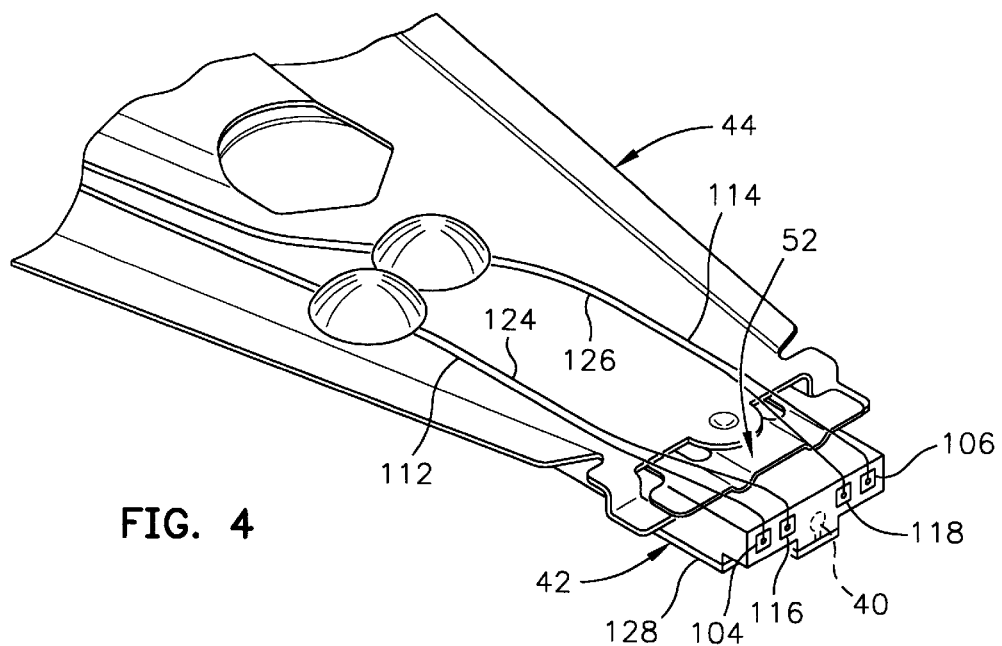
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 to place the magnetic head 40 in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals, and also provides control signals for moving the slider to various tracks. In FIG. 4 the slider 42 is shown mounted to a head gimbal assembly (FIGA) 52 which, in turn, is mounted to the suspension 44. The components described hereinabove may be mounted on a frame 54.

Figure 5:
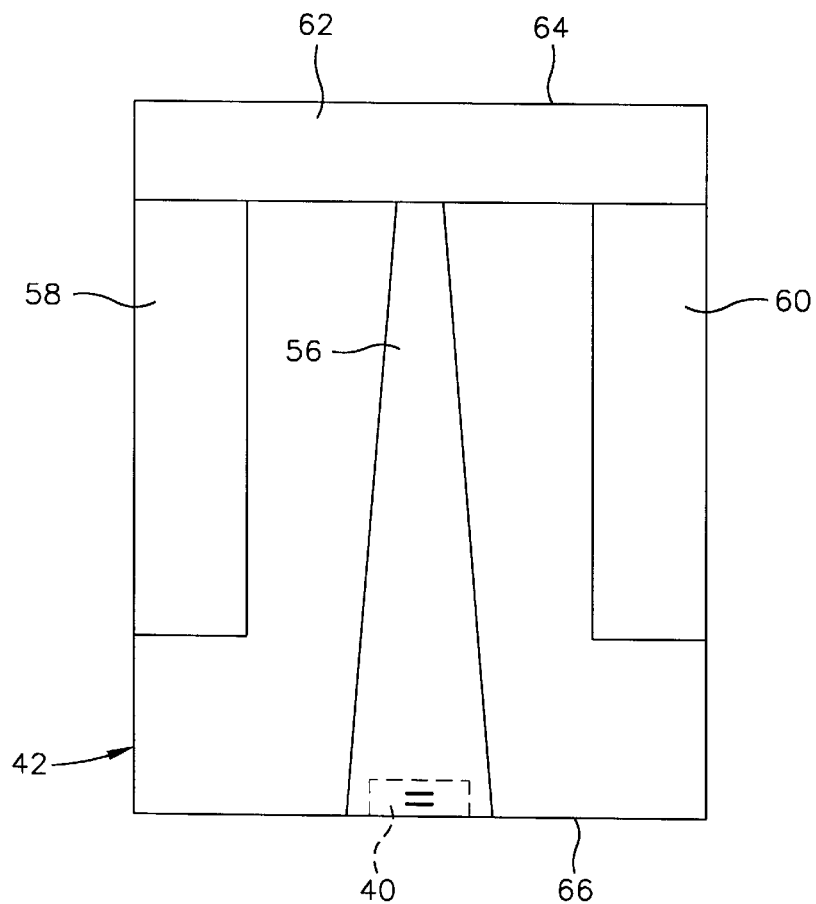
FIG. 5 is an ABS view of the slider and magnetic head taken along plane V—V of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of the magnetic head 40 which has a write head portion 70 and a read head portion 72, the read head portion employing a spin valve sensor 74 of the present invention. FIG. 7 is an ABS view of FIG. 6. The MR sensor 74 is sandwiched between first and second gap layers 76 and 78 and the gap layers are sandwiched between first and second shield layers 80 and 82. In response to external magnetic fields, the resistance of the MR sensor 74 changes. A sense current $I_s$ conducted through the sensor causes these resistance changes to be manifested as potential changes. These potential changes are then processed as readback signals by the processing circuitry 50 shown in FIG. 3.

The write head portion of the prior art head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads 108 and 110 (see FIGS. 9, 12 and 14) from the MR sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7.

Figure 9:
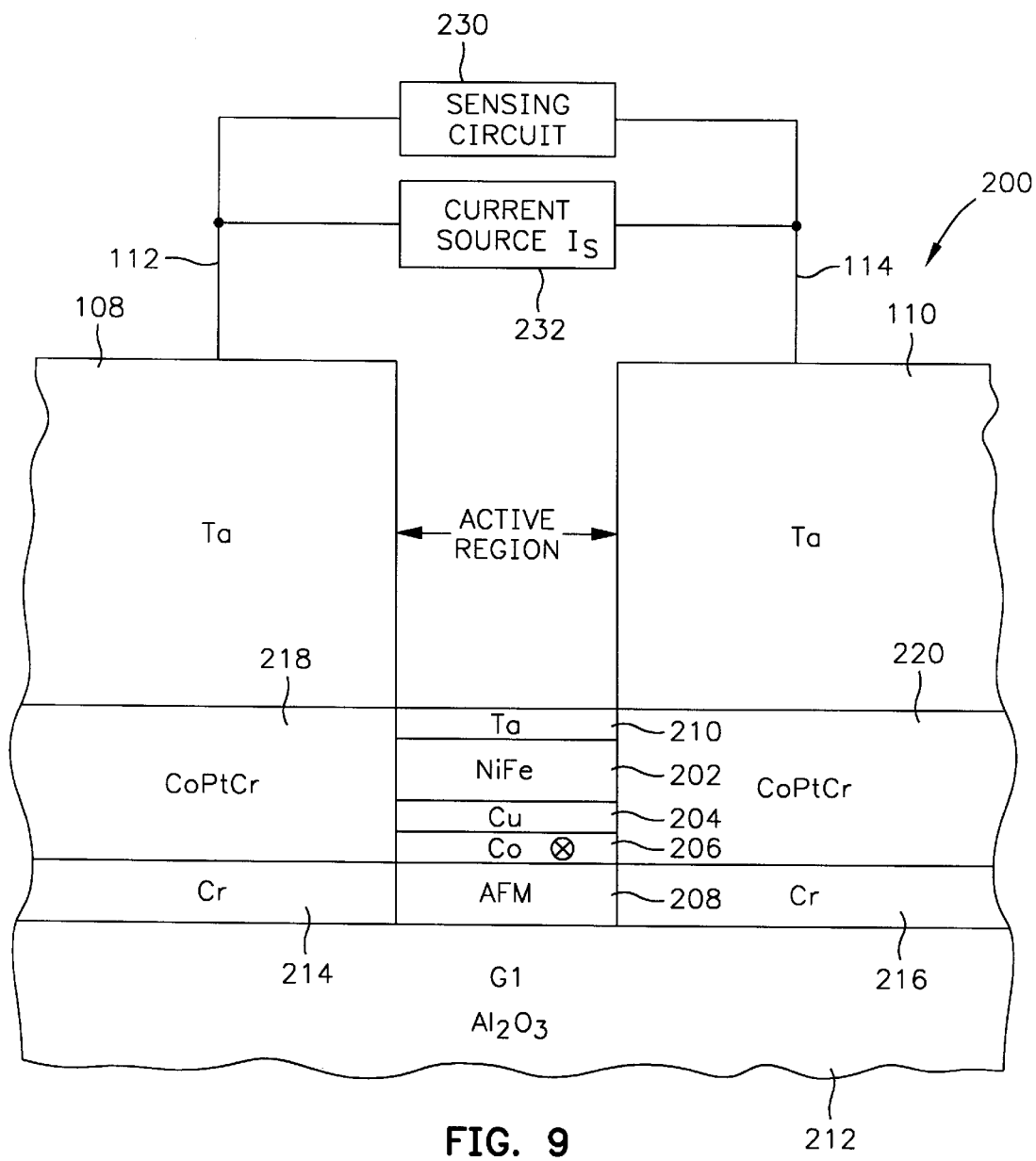
FIG. 9 is an ABS view of a prior art sensor employing an antiferromagnetic pinning layer.

A prior art spin valve sensor 200, which is shown in an ABS view in FIG. 9, has a ferromagnetic free layer 202, a nonmagnetic electrically conductive spacer layer 204 and a pinned ferromagnetic layer 206. The spacer layer 204 is sandwiched between the free layer 202 and the pinned layer 206. The pinned layer 206 has a surface which interfaces with a surface of an antiferromagnetic layer 208 so that the antiferromagnetic layer pins the magnetic moment of the pinned layer 206 in a direction perpendicular to the ABS. The moment of the pinned layer 206 is pinned in this direction by exchange coupling with the antiferromagnetic layer 208. An active portion of the sensor may be capped with a tantalum layer 210.

The sensor 200 rests on a first gap layer 212 which is the same as the gap layer 76 in FIG. 6. First and second chromium layers 214 and 216 may make contiguous junctions with side walls of the pinning layer 208. Hard bias layers 218 and 220 may make contiguous junctions with the side walls of the layers 202, 204, 206 and 210 for longitudinally biasing the free layer 202 parallel to the ABS. This biasing stabilizes the free layer and minimizes Barkhausen noise. Immediately adjacent the hard bias layers 218 and 220 may be the first and second lead layers 108 and 110, which are connected to the leads 112 and 114, which are also shown in FIG. 4. The leads 112 and 114 are connected to a sensing circuit 230 and a current source 232 which are a part of the processing circuitry shown in FIG. 3. The active region of the sensor is the width of the layers 202, 204, 206 and 210, as shown in FIG. 9, and is the distance between the contiguous junctions. This also defines the track width of the read head.

The free layer 202 has a magnetic moment which is free to rotate in first and second directions under the influence of field signals (flux incursions) from the rotating disk 34, these field signals being positive and negative going signals which are typically of equal magnitude. The sense current source 232 provides a sense current $I_s$ which is conducted through the sensor. The sensing circuit 230 senses potential changes across the sensor 200 when field signals are induced in the sensor by the rotating disk 34 shown in FIG. 1.

Each of the layers 202, 204, 206 and 210 conducts a portion of the sense current between the first and second leads 108 and 110. A key parameter in the operation of a spin valve sensor is that the spacer layer 204 have a thickness which is less than the mean free path of conduction electrons flowing between the first and second leads 108 and 110. The degree of electron scattering, which depends upon the relative angle between the magnetization of the free layer 202 and the magnetization of the pinned layer 206, determines the resistance of the sensor to the sense current $I_S$. The greatest scattering and the correspondingly greatest increase in resistance occurs when the magnetization of the free layer 202 and the magnetization of the pinned layer 206 are antiparallel and the least scattering and the correspondingly least resistance change occurs when the magnetization of the free layer 202 and the magnetization of the pinned layer 206 are parallel with respect to one another.

The magnetization of the free layer 202 is typically oriented parallel to the ABS so that upon receiving positive and negative field signals from a rotating disk the magnetization rotates upwardly or downwardly to decrease or increase the resistance of the sensor. This would be an opposite situation if the magnetization of the pinned layer 206 is oriented toward the ABS instead away therefrom. When the magnetization of the free layer 202 is oriented parallel to the ABS the transfer curve of the spin valve is symmetrical about a zero point.

Figure 10:
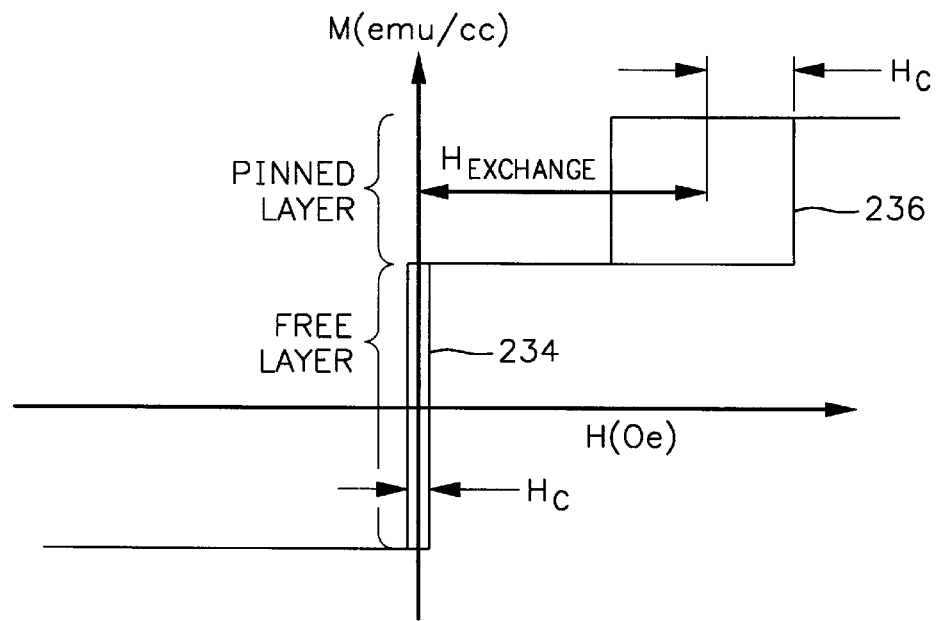
FIG. 10 is a graph illustrating M/H loops for the free and pinned layers of the sensor shown in FIG. 9.

FIG. 10 shows an M/H loop 234 for the free layer 202 and an M/H loop 236 for the pinned layer 206 of the prior art sensor 200 shown in FIG. 9. The free layer 202 operates in response to positive and negative applied fields which are slightly above and below zero. Positive and negative rotations of the magnetization of the free layer 202 relative to the magnetization of the pinned layer 236 changes the resistance of the sensor to enable detection of the applied signals from the rotating disk. It is important that the pinned layer 206 remain pinned in its location by exchange coupling field, which is represented by $H_{EXHANGE}$ shown in FIG. 10. Since the M/H loop of the pinned layer 206 has a degree of coercivity HC the pinning moment of the pinned layer 206 is equal to $H_{EXHANGE}$ plus the coercivity $H_C$.

Figure 11:
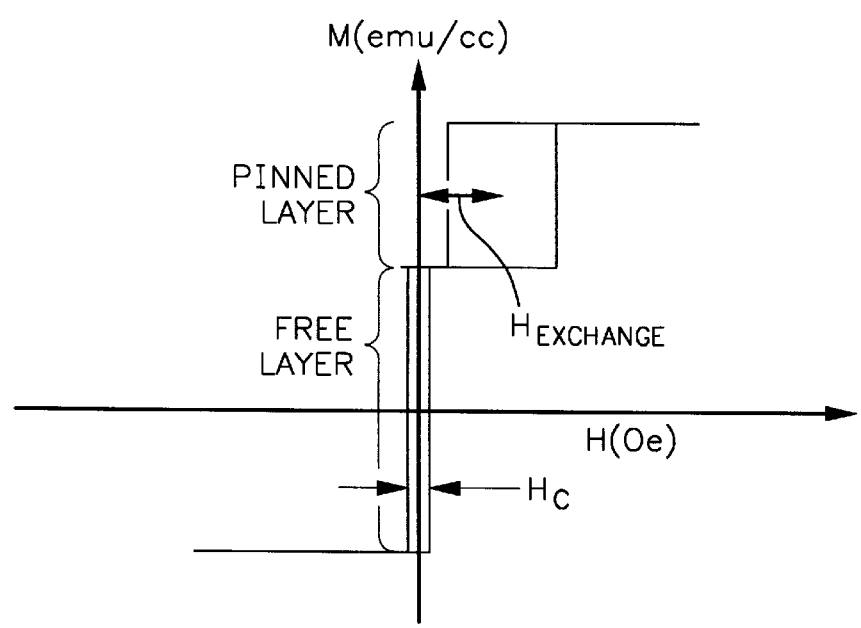
FIG. 11 is a graph showing M/H loops for the free and pinned layers of the sensor in FIG. 9 after a pinning layer has been subjected to a temperature above its blocking temperature.

A problem with the antiferromagnetic pinning layer 208, shown in FIG. 9, is that it can lose its orientation or partially lose its orientation, as shown in FIG. 11. This occurs when the antiferromagnetic pinning layer is subjected to a temperature above its blocking temperature. For instance, if the pinning layer 208 is iron manganese (FeMn), its blocking temperature is 230° C. An elevated temperature is typically encountered during operation of the magnetic head when it frictionally contacts an asperity on the rotating disk. Friction between the head and the asperity may raise the temperature of the pinning layer above its blocking temperature. When this occurs, the pinned layer 206 in FIG. 9 may lose its magnetic orientation, which can degrade the response of the sensor. Since the pinning layer 208 can only be reset by high temperature in the presence of a magnetic field, the disk drive assembly is rendered inoperative. Accordingly, it would be desirable to provide a device for pinning the pinned layer 206, even though the pinning layer 208 is subjected to high temperature conditions.

Figure 12:
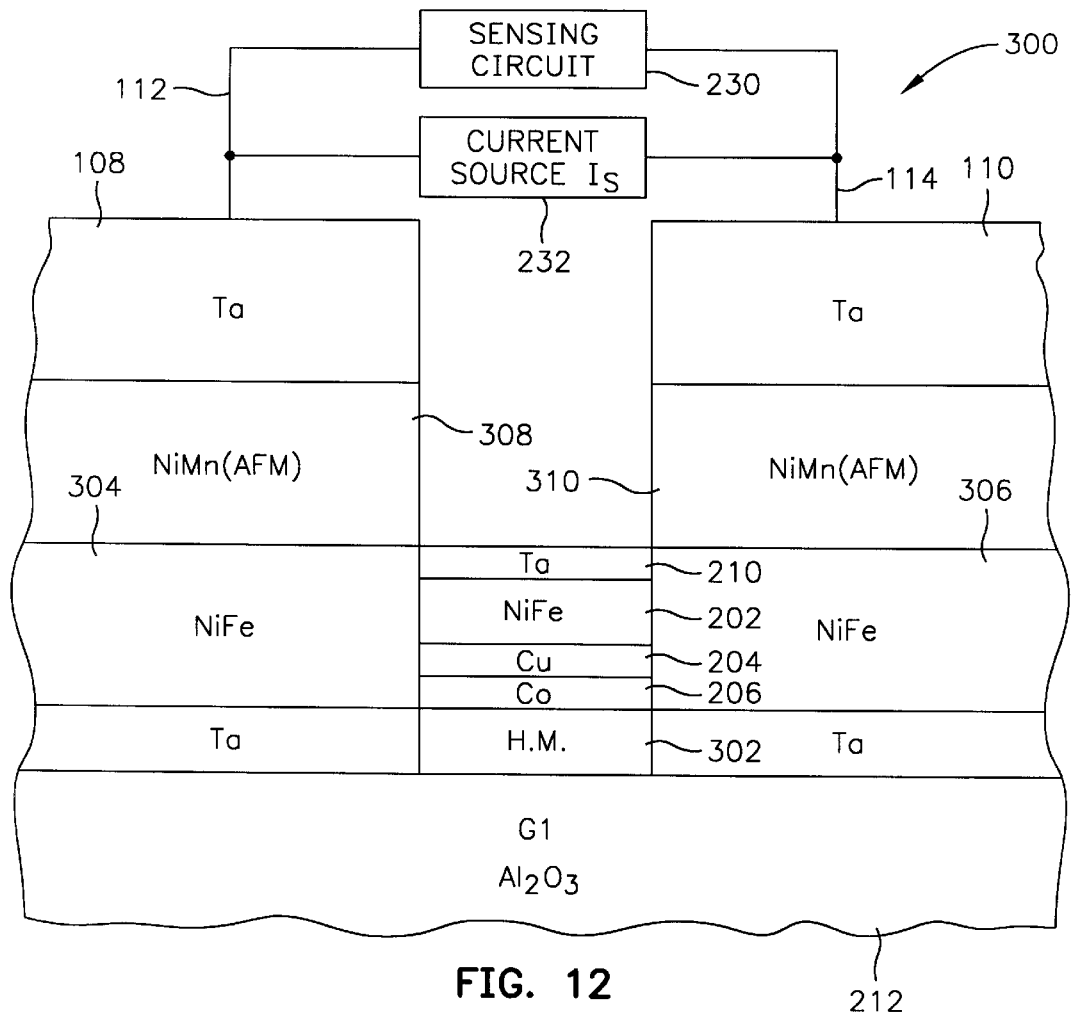
FIG. 12 is an ABS view of a spin valve sensor employing a hard magnet for pinning the pinned layer.
Figure 13:
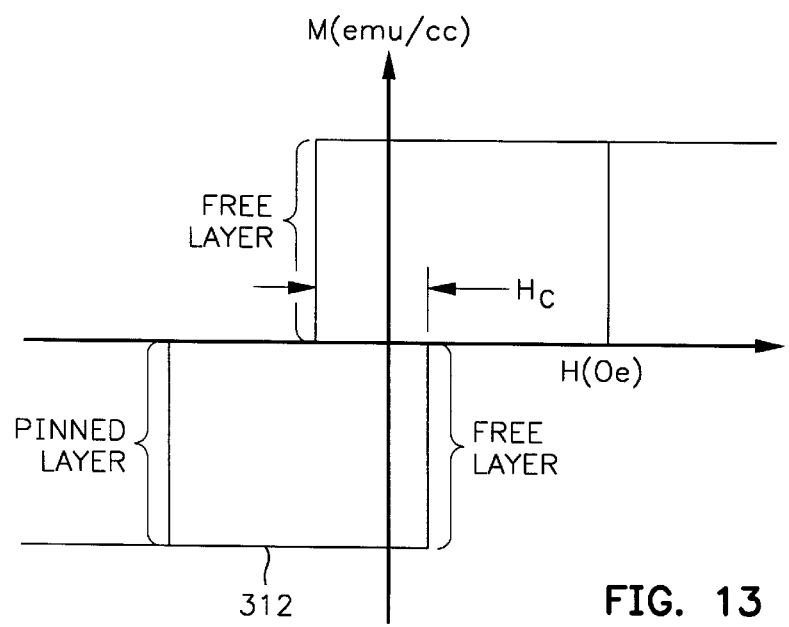
FIG. 13 is a graph illustrating M/H loops for the free and pinned layers of the sensor shown in FIG. 12.

I have investigated a sensor 300, shown in FIG. 12, to determine whether the use of certain materials in its structure might overcome the problem of loss of magnetic orientation of the pinning layer upon exposure to a temperature above its blocking temperature. The sensor 300 in FIG. 12 is the same as the sensor in FIG. 9 except a hard magnetic material is employed for a pinning layer 302, soft magnetic layers 304 and 306 form contiguous junction with the layers 202, 204, 206 and 210, and antiferromagnetic layers 308 and 310 are immediately adjacent the layers 304 and 306 respectively. A typical hard magnetic material (H.M.) for the pinning layer 302 is CoNi or CoPtCr. This material is crystalline and has both a high coercivity and a high magnetic moment. The high coercivity of the hard magnetic material is employed for pinning the pinned layer 206. Unfortunately, the multiple crystals of the hard magnetic material 302 propagate randomly-oriented demagnetizing fields into the free layer 202 through the pinned layer 206 and the spacer layer 204. These randomly-oriented demagnetizing fields increase the coercivity $H_C$ of the free layer 202, which makes the free layer 202 stiffer in its response to applied fields from the rotating disk. This is undesirable because the free layer 202 should have low coercivity in order to respond to small magnitude fields from the rotating disk. The M/H loops for the free layer 204 and the pinned layer 206 are shown in FIG. 13. It can be seen that the coercivity $H_C$ of the free layer 202, shown in FIGS. 12 and 13, is significantly larger than the coercivity $H_C$ of the free layer 202 shown in FIGS. 9–11. Accordingly, the sensor shown in FIG. 12 is not as sensitive to applied signals as the sensor shown in FIG. 9.

The M/H loop for the pinned layer 206 is shown at 312 in FIG. 13. The pinning is in a negative direction, and is set in that direction by the direction of the field of the hard magnetic material employed for the pinning layer 302. If desired, the pinned direction could be in the positive direction by simply reversing the direction of the field of the hard magnetic material employed for the pinning layer 302. It should be noted that the coercivity $H_C$ of the free layer is slightly asymmetrical in the negative direction since the free layer is somewhat affected by an orange peel effect between the surfaces of the pinned layer 206, the spacer layer 204 and the free layer 202. This effect is about 15 Oe in the negative direction since the pinning layer 302 is oriented in the negative direction, as shown in FIG. 13.

In the sensor 300, shown in FIG. 12, an antiferromagnetic material, such as nickel manganese (NiMn) was employed for the layers 308 and 310 for pinning the magnetic moments of the layers 304 and 306. The layers 304 and 306 may be nickel iron (NiFe) as shown. The fields from the magnetizations of the layers 304 and 306 are then employed for stabilizing the free layer 202, as discussed hereinabove. By employing an antiferromagnetic material for the layers 308 and 310 their magnetizations can be set separately by heat and a magnetic field as compared to setting the pinning layer 302 by a magnetic field at room temperature. My investigation of the sensor 300, shown in FIG. 12, indicated a strong-felt need for a hard magnetic material for the pinning layer 302 which would pin the pinned layer 206 by high coercivity, without affecting the coercivity of the free layer 202.

Figure 14:
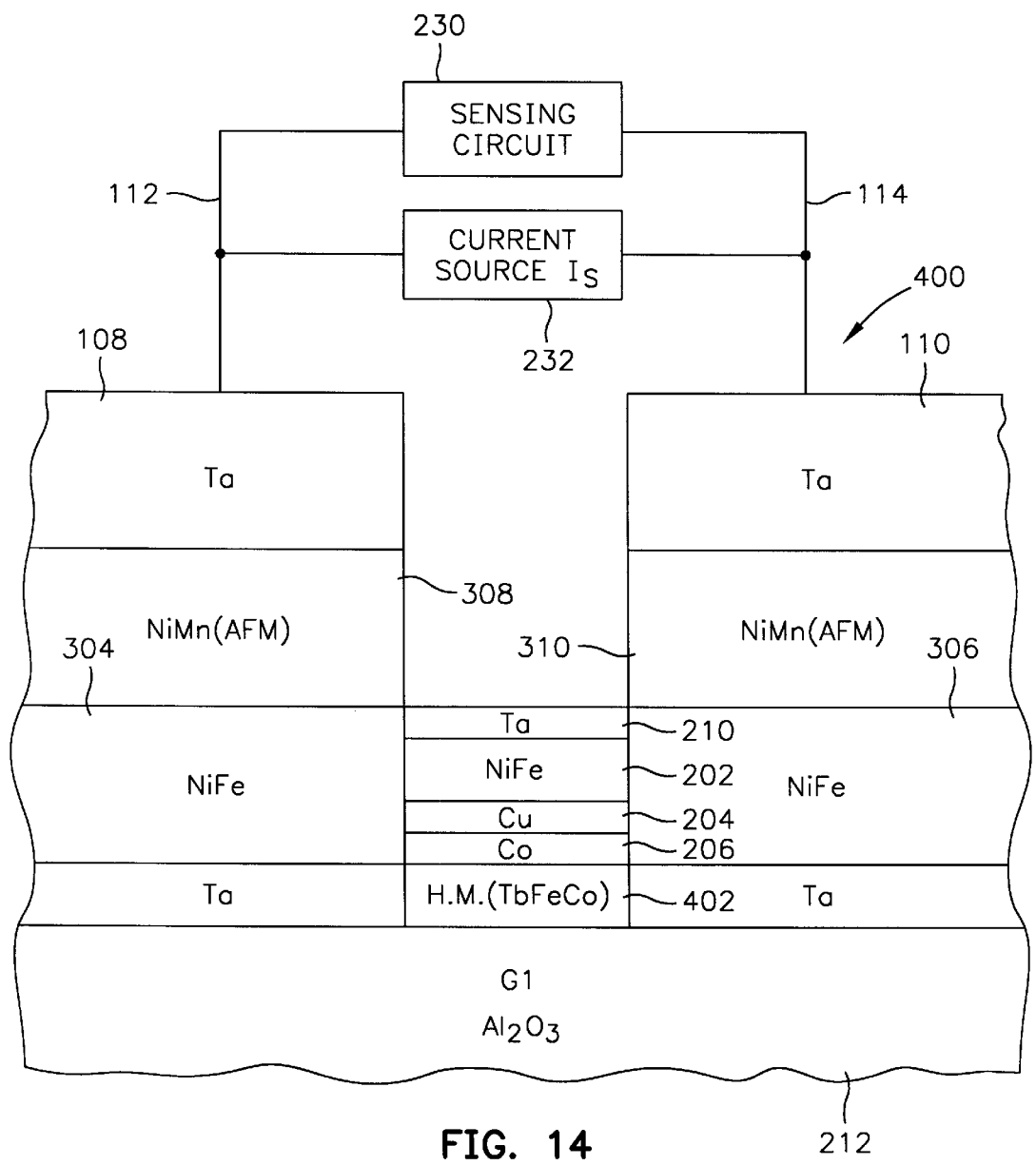
FIG. 14 is an ABS view of the present invention employing the coercivity of a low moment pinning layer for pinning a pinned layer.
Figure 15:
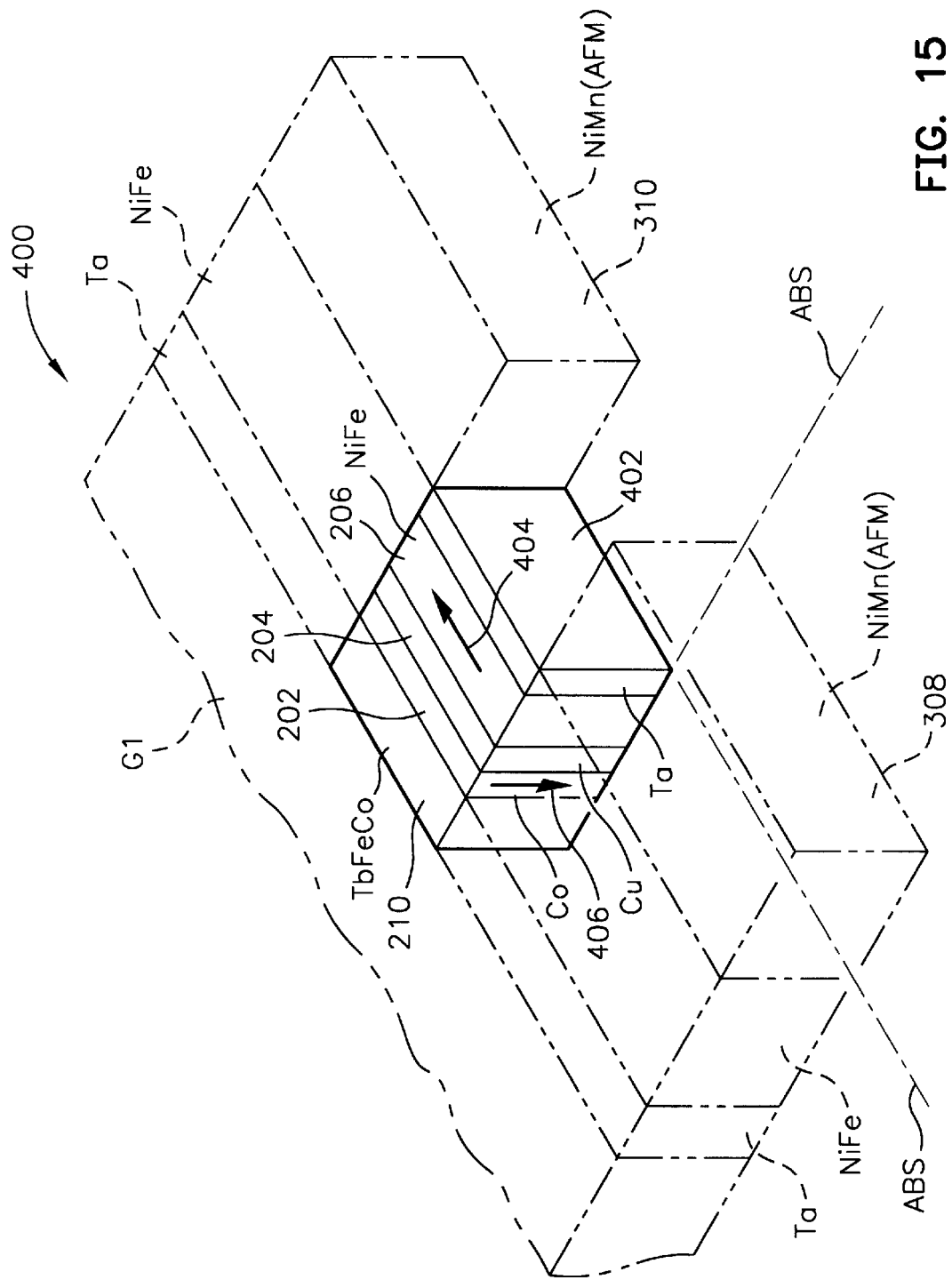
FIG. 15 is an isometric illustration of the spin valve sensor shown in FIG. 14.

The present sensor 400, shown at FIGS. 14 and 15, is the same as the sensor 300 shown in FIG. 12, except that it employs a pinning layer 402 constructed of a hard magnetic material that has high coercivity and low, or substantially no, magnetic moment. This material has substantially no impact on the coercivity $H_C$ of the free layer 202. I have found that preferred materials for the pinning layer 402 are terbium iron cobalt (TbFeCo) and cobalt samarium (CoSm), which are amorphous. I have also discovered that cobalt platinum chrome (CoPtCr) may be employed providing the chrome is of a sufficient percentage by atomic weight to substantially overcome the magnetic moment of the material. CoPtCr is not an amorphous material. If the chrome is 15%, or more, by atomic weight, the magnetic moment of the CoPtCr material is below 300 emu/cc, which is an acceptable level. The coercivity $H_C$ of the materials is greater than 500 Oe, which I have found to be acceptable for pinning the magnetic moment of the pinned layer 206. Accordingly, in the practice of the invention, the magnetic moment of the pinning layer 402 should be below 300 emu/cc, and the coercivity should be above 500 Oe. With this arrangement, the coercivity of the material of the pinning layer 402 pins the magnetic moment of the pinned layer 206, and renders the magnetic moment of the pinning layer 402 at zero, or near zero, thereby producing substantially no increase in the coercivity of the free layer 202. As discussed hereinabove, the layers 308 and 310 pin the magnetic moments of the soft magnetic layers 304 and 306 which, in turn, stabilize the free layer 202. As stated hereinabove, the reason for this arrangement is to establish the magnetic orientations of the layer 402 separately from the layers 308 and 310. As shown in FIG. 15, the magnetic moment 404 of free layer 206 is directed parallel to the ABS and the magnetic moment 406 of the pinned layer 202 is directed perpendicular to the ABS which may be either toward the ABS, as shown in FIG. 15, or away from the ABS.

Figure 16:
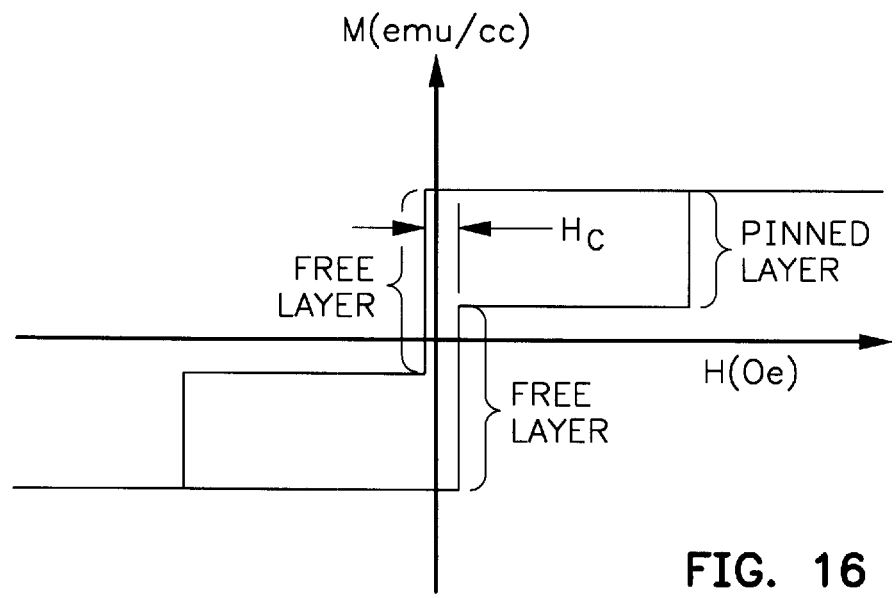
FIG. 16 is a graph showing M/H loops for the free and pinned layers when the pinned layer is pinned in a positive applied field direction.
Figure 17:
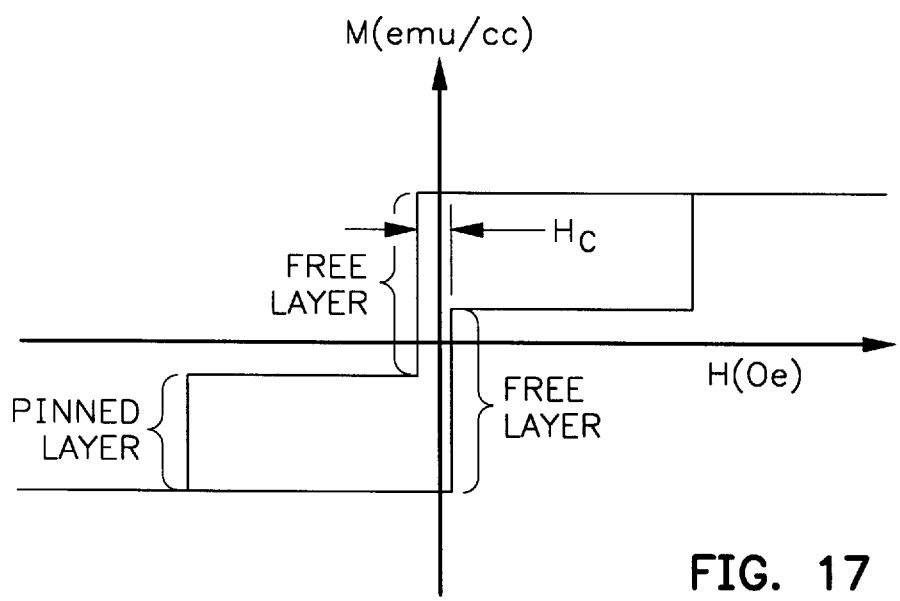
FIG. 17 is a graph showing M/H loops for the free and pinned layers of a spin valve sensor with the pinned layer being pinned in a negative applied field direction.

FIGS. 16 and 17 show M/H loops for the pinned layer 206 and the free layer 202 of the sensor 400 in FIG. 14. It can be seen that the free layer 202 responds to applied fields that are slightly positive and negative with respect to a zero point. In FIG. 16 the pinned layer 206 is pinned in a positive direction by subjecting the pinning layer 402 to a magnetic field in a positive direction at room temperature. If the pinning layer 402 is subjected to a negative field at room temperature it will be pinned in a negative direction, as shown in FIG. 17. The M/H loop for the free layer 202 is asymmetrical in both FIGS. 16 and 17. In FIG. 16 the M/H loop is biased toward the positive side because the pinned layer 206 is pinned in a positive direction, while the M/H loop for the free layer 202 in FIG. 17 is biased in a negative direction because the pinned layer is pinned in a negative direction. As discussed hereinabove, this is due to the orange peel effect between the surface of the pinned layer 206, the spacer layer 204 and the free layer 202. It can readily be seen that the pinning layer 402 is not affected by high temperatures. More importantly, however, the pinning layer 402 has no, or substantially no, magnetic moment to cause a change in the coercivity $H_C$ of the free layer 202. Should a magnetic field disorient the pinning layer 402, it can be simply reset by applying another magnetic field at room temperature while the head is mounted on the suspension. Accordingly, the present invention allows the direction of the magnetic moment of the pinning layer to be reset after the head is mounted on the suspension and employed in its operational environment.

Figure 18:
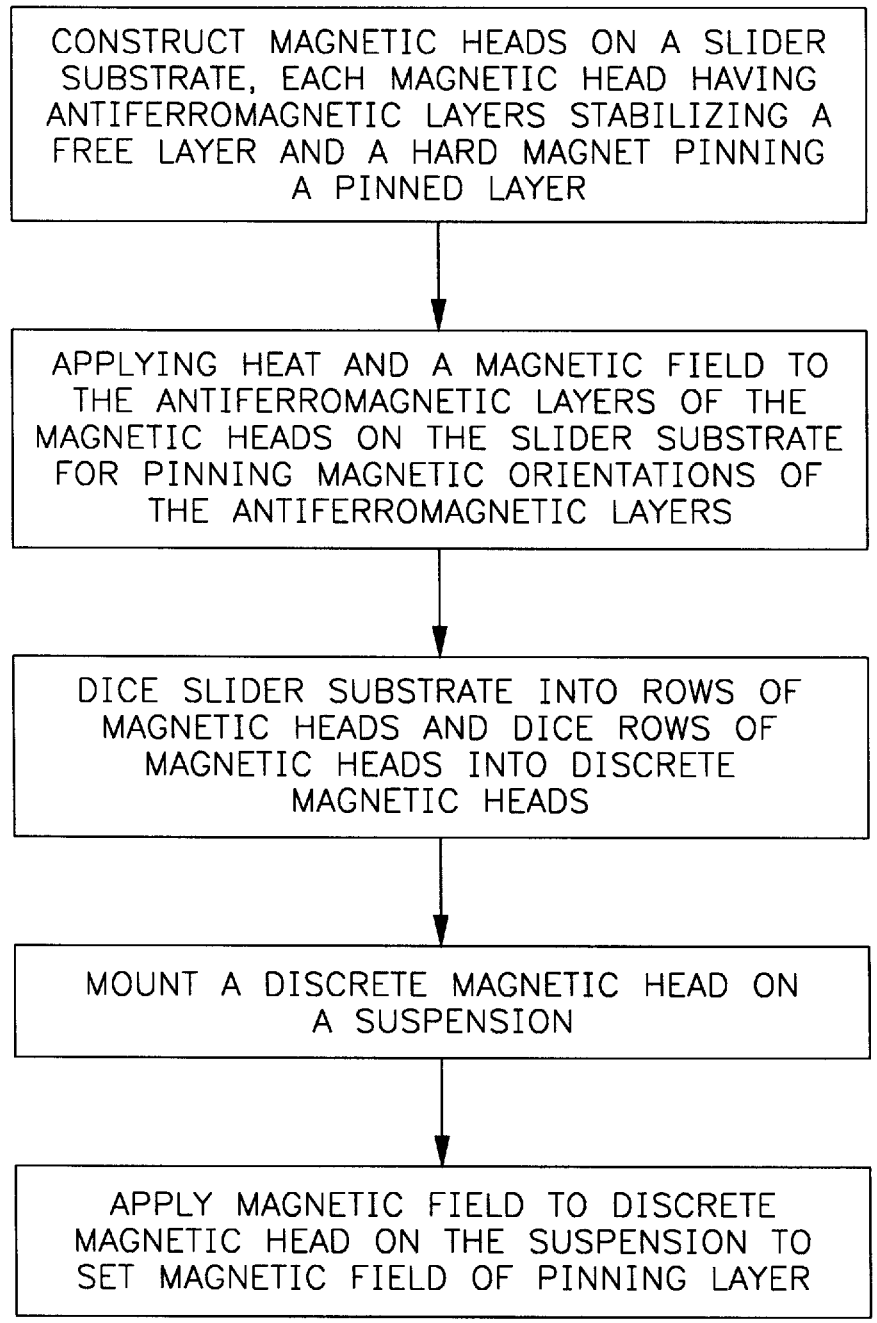
FIG. 18 is a chart showing a series of steps in making the present invention.

FIG. 18 is an exemplary method for making the present invention. First a number of magnetic heads may be constructed in rows and columns on a substrate at the wafer level. The substrate may be titanium carbide (TiC) which can be employed for making the slider in a magnetic disk drive. Next, heat is applied to the pinning layer at or above its blocking temperature of each of the magnetic heads in the presence of a magnetic field while the magnetic heads are still at the wafer level. Next the magnetic heads are diced into rows of magnetic heads and the rows of magnetic heads are diced into discrete magnetic heads. Each magnetic head is then mounted on a suspension which can then be mounted on a magnetic disk drive. A magnetic field is then applied to the magnetic head in the magnetic disk drive to set the magnetic field of the pinning layer.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetoresistive (MR) spin valve read sensor that senses positive and negative magnetic fields from a magnetic medium, comprising:
   a ferromagnetic free layer having a magnetic moment for rotating in first and second directions in response to said positive and negative magnetic fields, respectively;
   a ferromagnetic pinned layer;
   a ferromagnetic pinning layer immediately adjacent the pinned layer for pinning a magnetic moment of the pinned layer in a predetermined direction;
   said pinning layer being cobalt samarium (CoSm); and a nonmagnetic spacer layer between the free layer and the pinned layer.

2. The spin valve read sensor of claim 1 wherein the pinning layer has a coercivity greater than 500 Oe and a magnetic moment less than 300 emu/cc.

3. A spin valve read sensor of claim 2 wherein the magnetic moment is substantially zero.

4. A magnetic head comprising:
   a write head including:
      an insulation stack;
      a coil layer embedded in the insulation stack;
      first and second pole pieces connected at a back gap and having pole tips with edges forming a portion of an air bearing surface (ABS);
      the insulation stack being disposed between the first and second pole pieces;
      a write gap layer between the pole tips of the first and second pole pieces, and forming a portion of the ABS;
   a read head including:
      a spin valve sensor, first and second gap layers and first and second shield layers; and
      the spin valve sensor being disposed between the first and second gap layers, and the first and second gap layers being disposed between the first and second shield layers; the spin valve sensor including:
      first and second leads disposed between the first and second gap layers and connected to the spin valve sensor for conducting a sense current through the spin valve sensor;
      a ferromagnetic free layer having a magnetic moment for rotating in first and second directions in response to positive and negative magnetic fields, respectively;
      a pinned layer having a magnetic moment;
      a pinning layer adjacent said pinned layer for pinning the magnetic moment of the pinned layer;
      said pinning layer being cobalt samarium (CoSm); and
      a magnetically insulative spacer layer between the free layer and the pinned layer.

5. The magnetic head of claim 4, wherein the pinning layer has a coercivity greater than 500 Oe and a magnetic moment less than 300 emu/cc.

6. A magnetic head of claim 5 wherein the magnetic moment is substantially zero.

7. A magnetic disk drive comprising:
   a write head including:
      an insulation stack;
      a coil layer embedded in the insulation stack;
      first and second pole pieces connected at a back gap and having pole tips with edges forming a portion of an air bearing surface (ABS);
      the insulation stack being disposed between the first and second pole pieces;
      a write gap layer between the pole tips of the first and second pole pieces, and forming a portion of the ABS;
   a read head including:
      a spin valve sensor, first and second gap layers and first and second shield layers;
      the spin valve sensor disposed between the first and second gap layers, and the first and second gap layers being disposed between the first and second shield layers; the spin valve sensor including:
      a ferromagnetic free layer having a magnetic moment for rotating in first and second angular directions in response to positive and negative magnetic fields, respectively;
      a pinned layer having a magnetic moment;
      a pinning layer adjacent said pinned layer for pinning the magnetic moment of the pinned layer;
      said pinning layer being cobalt samarium (CoSm);
      a magnetically insulative spacer layer between the free layer and the pinned layer; and
      first and second leads disposed between the first and second gap layers and connected to the spin valve sensor for conducting a sense current through the sensor; the write head and the read head being disposed adjacent one another to form a combined magnetic head;
   a frame;
   a magnetic disk rotatably supported on the frame;

a support mounted on the frame for supporting the head in a transducing relationship with the magnetic disk;

means for rotating the magnetic disk;

positioning means connected to the support for moving the combined magnetic head to multiple positions with respect to said magnetic disk; and means connected to the combined magnetic head, to the means for rotating the magnetic disk and to the positioning means for exchanging signals with the combined magnetic head, for controlling movement of the magnetic disk and for controlling the position of the combined magnetic head.

8. A magnetic disk drive of claim 7 wherein the pinning layer has a coercivity greater than 500 Oe and a magnetic moment less than 300 emu/cc.

9. A magnetic disk drive of claim 8 wherein the magnetic moment is substantially zero.

\* \* \* \* \*